DIVERSITY RECEIVER INDICATOR CIRCUIT
Filed Oct. 9, 1950
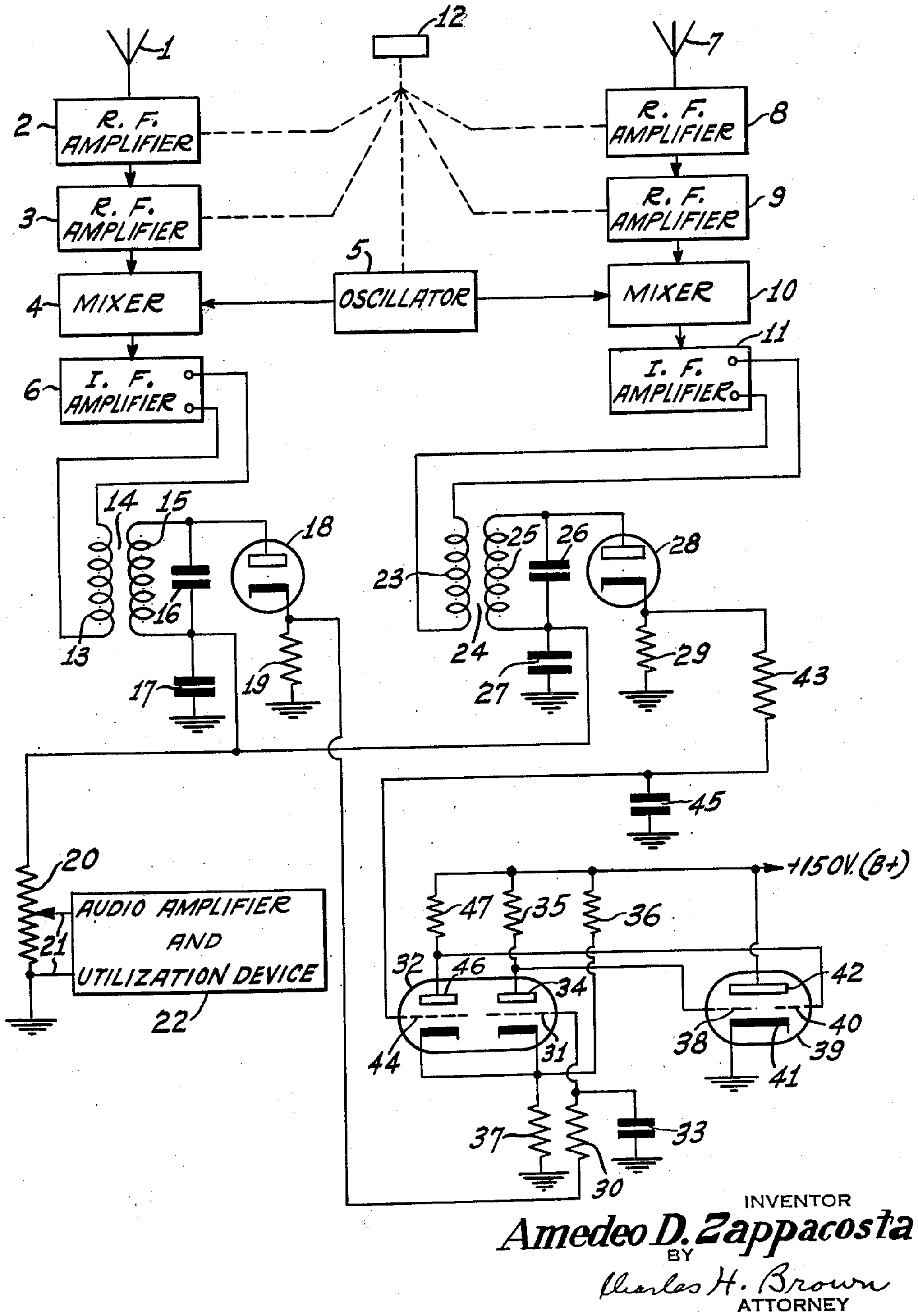
INVENTOR
Amedeo D. Zappacosta
BY
Charles H. Brown
ATTORNEY Patented Dec. 2, 1952 2,620,437

UNITED STATES PATENT OFFICE 2,620,437

DIVERSITY RECEIVER INDICATOR CIRCUIT

Amedeo D. Zappacosta, Havertown, Pa., assignor to Radio Corporation of America, a corporation of Delaware Application October 9, 1950, Serial No. 189,111

1 Claim. (Cl. 250—20)

This invention relates to a diversity receiver indicator circuit, and more particularly to a dual diversity receiver signal intensity comparator circuit.

Recently, rather inexpensive dual diversity radio receivers for home use have been developed. Such receivers have particular utility for foreign locations, where radio reception in the short-wave bands must be had; reception in these bands with a single receiver, however, is hampered by fading conditions. Reception in these bands of frequencies can be greatly improved by utilizing two separate receivers connected to a common audio output channel and supplied by separate antennas in space or polarization diversity, since it is extremely unlikely that fading of the signal will occur with respect to both such antennas at the same time. These separate receivers, for home use, are ordinarily unicontrolled, that is, are both tuned by means of a single tuning control.

For proper operation of dual diversity home receivers of the foregoing type, it is essential that the two receivers be initially adjusted to have substantially equal outputs under optimum receiving conditions, and also that they each be adjusted to have maximum gain under such conditions. In order to effect such initial adjustment, a circuit for comparing the signal intensities in the two receivers must be provided. Prior to this invention, one rather well-known type of signal intensity comparator circuit has included at least two micro-ammeters, one connected to be responsive to the signal intensity in each of the two respective receivers. The prior arrangements were quite expensive, causing the total cost of the unit to be unduly high. Moreover, the arrangements are in most cases used only once (for initial adjustment of the two receivers), being used again infrequently, if at all. Because of their high first cost and extremely infrequent utilization, prior arrangements which include micro-ammeters are rather impractical for use in home-type diversity receivers, where costs must be kept to a minimum in a competitive market. These prior measuring instruments have another drawback which militates against their use in home receivers. Micro-ammeters emphasize the quantitative indication of signal intensity, calling for more mental effort to make an intensity comparison than if the qualitative indication were emphasized. It is quite important that home receivers be capable of adjustment and operation with a minimum of mental effort.

An object of this invention is to provide a simple and relatively inexpensive signal intensity comparator circuit for use in dual diversity receivers, particularly those adapted for home use.

Another object is to devise a signal intensity comparator circuit which gives a qualitative indication of signal equality, thus reducing the mental effort required for utilization of the circuit.

The foregoing and other objects of the invention will be best understood from the following description of an exemplification thereof, reference being had to the accompanying drawing, wherein the single figure is a diagrammatic representation of a circuit according to this invention.

The objects of this invention are accomplished, briefly, in the following manner: the intermediate frequency outputs of two radio receivers are connected to a common diode load for utilization purposes. An electron-ray tube having two ray-control electrodes is utilized, the current supplied by each receiver to the common load being applied separately, through an amplifier, to a corresponding one of the ray-control electrodes of such tube. The angular width of the shadow cast by each control electrode on the tube target gives a qualitative visual indication of the signal intensity in the corresponding receiver. The intensities of the two signals are compared by visually comparing the angular widths of the two shadows on the tube target.

In the drawing, a receiving antenna 1 feeds input to a tunable radio frequency amplifier 2, the output of which is fed through another tunable radio frequency amplifier 3 to a mixer 4 to which are also supplied oscillations from a suitable oscillator 5. This is a more or less conventional superheterodyne receiver arrangement, the mixer 4 supplying intermediate frequency energy to an intermediate frequency amplifier 6. Elements 1, 2, 3, 4 and 6 may be thought of as comprising a first radio receiver. A second similar radio receiver 7, 8, 9, 10 and 11 is utilized. Receiving antenna 7, which is in space or polarization diversity with respect to antenna 1, feeds input to a tunable radio frequency amplifier 8, the output of which is fed through another tunable radio frequency amplifier 9 to a mixer 10 to which are also supplied oscillations from oscillator 5 which is common to both receivers. Mixer 10 supplies intermediate frequency energy to an intermediate frequency amplifier 11. The second radio receiver 7 to 11 is also a superheterodyne receiver and is arranged in diversity with respect to the first receiver. Units 2, 3, 5, 8 and 9 are unicontrolled for tuning purposes, as indicated by the dotted lines, and are operated by a single tuning control knob, indicated at 12. This is a more or less conventional arrangement.

The output of intermediate frequency amplifier 6 is applied to the primary 13 of a coupling transformer 14, the secondary 15 of which is tuned by a capacitor 16. One end of secondary 15 is bypassed to ground for intermediate frequencies by condenser 17. The intermediate frequency energy appearing in winding 15 is rectified or detected by a diode 18 the anode of which is connected to the upper end of winding 15 and the cathode of which is connected through a load resistor 19 to ground, a second load resistor 20 being connected effectively in series with resistor 19, between ground and the lower end of winding 15. The detected voltage of audio frequency derived from amplifier 6 appears across resistor 20, which is common to the two receivers and therefore constitutes a common diode load. Leads 21, connected to resistor 20, supply the useful audio output to an audio amplifier and utilization device 22, of any suitable type.

Similarly, the output of intermediate frequency amplifier 11 is applied to the primary 23 of a coupling transformer 24, the secondary 25 of which is tuned by a capacitor 26. One end of secondary 25 is bypassed to ground for intermediate frequencies by condenser 27. The intermediate frequency energy appearing in winding 25 is rectified or detected by a diode 28 the anode of which is connected to the upper end of winding 25 and the cathode of which is connected through a load resistor 29 to ground, load resistor 20 being connected effectively also in series with resistor 29, between ground and the lower end of winding 25. The detected voltage of audio frequency derived from amplifier 11 also appears across resistor 20. Therefore, the two radio receivers are both connected to supply audio frequency energy to the common diode load 20 and the unit 22. By this arrangement, diversity action is produced in unit 22 and most of the disadvantages resulting from fading are eliminated.

Although diodes 18 and 28 are illustrated as being separate tubes, it will be appreciated that these two diodes may together be a single tube of the twin-diode type, such as 6H6, for example. These diodes are illustrative of any suitable rectifiers which may be used, such as for example selenium or germanium or copper oxide rectifiers.

It may be seen that a voltage proportional to the current supplied by the first receiver to common load 20 appears across resistor 19, while a voltage proportional to the current supplied by the second receiver to common load 20 appears across resistor 29. Prior to this invention, the current supplied by each receiver to the common load was usually measured by an individual micro-ammeter. However, according to this invention electronic visual indications of the two separate currents are provided.

The voltage across resistor 19 is applied through a resistor 30 to one control grid 31 of a twin-triode tube 32 connected to operate as two separate direct current amplifiers. Tube 32 may, for example, be of the 6SN7 type. An intermediate frequency bypass condenser 33 is connected from grid 31 to ground. The right hand anode 34 of tube 32 is connected through a load resistor 35 to a source of positive potential. Grid bias is provided by connecting the two cathodes of tube 32 together and to the junction point of two series-connected voltage divider resistors 36 and 37, which are placed across the source of positive potential.

The amplified potential at anode 34 is applied to one ray-control electrode 38 of an electron-ray tube 39. Tube 39 is preferably of the 6AF6-G twin-indicator type, and includes two ray-control electrodes 38 and 40, a heated cathode 41 and a target anode 42. Cathode 41 is grounded and target anode 42 is connected to the positive potential source, as indicated.

With no signal in the first receiver (no voltage across resistor 19) the angular width of the shadow produced by electrode 38 on target 42 is relatively large. As signal comes in and increases in amplitude, the angular width of such shadow decreases, having its minimum width in response to maximum voltage across resistor 19. The angular width of this shadow, therefore, provides a qualitative visual indication of the intermediate frequency signal intensity in the first radio receiver, indicating the current suppled by the receiver 2, 3, 4, 6 to the common load 20.

The voltage across resistor 29 is applied through a resistor 43 to the other control grid 44 of tube 32. An intermediate frequency bypass condenser 45 is connected from grid 44 to ground. The left hand anode 46 of tube 32 is connected through a load resistor 47 to the source of positive potential.

The amplified potential at anode 46 is applied to ray-control electrode 40 of tube 39. With no signal in the second receiver (no voltage across resistor 29) the angular width of the shadow produced by electrode 40 on target 42 is relatively large. As signal comes in and increases in amplitude, the angular width of such shadow decreases, having its minimum width in response to maximum voltage across resistor 29. The angular width of this shadow, therefore, provides a qualitative visual indication of the intermediate frequency signal intensity in the second radio receiver, indicating the current supplied to the common load 20 by the receiver 8, 9, 10, 11.

When the system described is in operation, that is, when the two radio receivers are energized, the intensities of the two signals are easily compared by visually comparing the angular widths of the two shadows (produced by electrodes 38 and 40) on the tube target 42. Thus, a direct qualitative indication of signal equality is provided, a minimum of mental effort being required.

The arrangement described, including the tubes 32 and 39, is considerably less expensive than prior art arrangements.

In operation, with both receivers energized, the procedure is somewhat as follows. The radio frequency or intermediate frequency gain of the two receivers is adjusted, while observing target 42, until the two shadows observed are each of minimum angular width and until the two shadows are of substantially equal angular widths. This means that the signal intensities in the two receivers are substantially equal to each other and are both of the desired high intensity. The dual diversity receiver system can then be operated in the normal manner, for reception of radio programs, until another adjustment is deemed necessary, which under normal conditions will not be until a quite considerable time after the initial adjustment.

It will thus be seen that the invention provides a very simple arrangement, one which can be used with extreme facility and one which is also very efficient and effective.

What I claim to be my invention is as follows:

A signal intensity comparator circuit for diversity receivers, comprising separate means for detecting the signal output of each receiver and for applying each detected output to a corresponding separate load impedance and also to a load impedance common to all of the receivers, a utilization device coupled to said common impedance to receive detected output from all of the receivers simultaneously, means for producing an electron beam, a pair of beam current control electrodes in the path of said beam, means for applying the voltage developed across a first separate load impedance to one of said beam current control electrodes, and means for applying the voltage developed across a second separate load impedance to the other of said beam current control electrodes.

AMEDEO D. ZAPPACOSTA.

REFERENCES CITED

The following references are of record in the file of this patent:

UNITED STATES PATENTS

| Number | Name | Date |
|---|---|---|
| 1,874,866 | Beverage et al. | Aug. 30, 1932 |
| 1,901,117 | Peterson | Mar. 14, 1933 |
| 2,004,126 | Moore | June 11, 1935 |
| 2,130,485 | Feldman et al. | Sept. 20, 1938 |
| 2,296,089 | Crosby | Sept. 15, 1942 |
| 2,451,584 | Stone | Oct. 19, 1948 |